United States Patent Office 3,664,828
Patented May 23, 1972

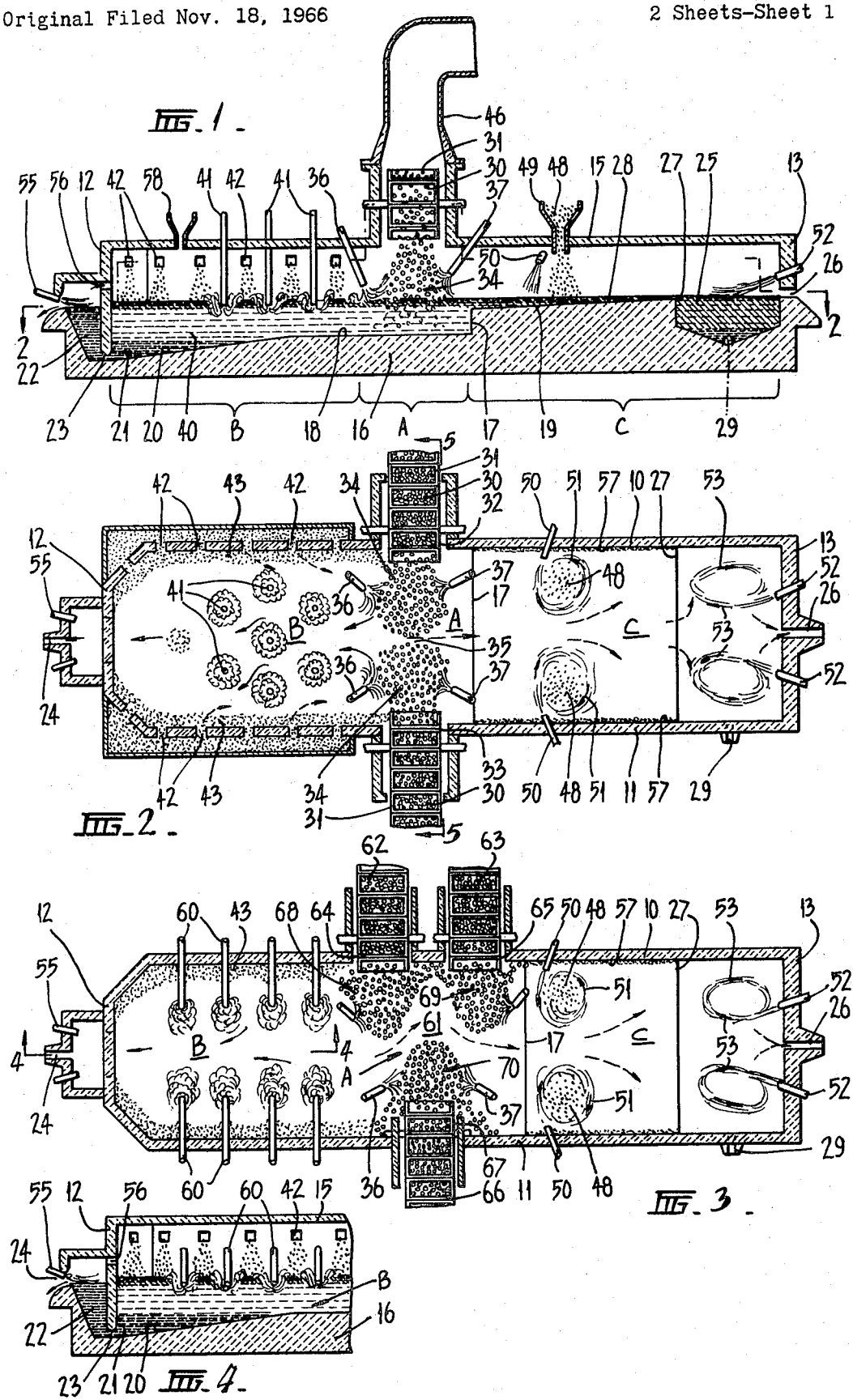

3,664,828
REVERBERATORY SMELTING OF COPPER CONCENTRATES
Howard Knox Worner, North Balwyn, Victoria, Australia, assignor to Conzinc Riotinto of Australia Limited, Melbourne, Victoria, Australia
Original application Nov. 18, 1966, Ser. No. 595,510, now Patent No. 3,527,449, dated Sept. 8, 1970. Divided and this application Feb. 17, 1969, Ser. No. 817,213
Claims priority, application Australia, Nov. 22, 1965, 66,820/65
Int. Cl. C22b *15/00, 15/14*
U.S. Cl. 75—73
15 Claims

ABSTRACT OF THE DISCLOSURE

The invention concerns a method for continuously smelting and converting copper concentrates including providing at remote ends of the furnace copper and slag outlets, forming in the furnace a smelting zone, a converting zone and a slag separation zone with the converting zone being between the smelting zone and the copper outlet and the slag separation zone being between the smelting zone and the slag outlet, feeding concentrates into the smelting zone, forming a restricted passage in the smelting zone between the converting zone and the slag separation zone, jetting oxidising gas into the molten material in the smelting zone, causing matte formed in the smelting zone to flow into the converting zone, jetting oxidising gas into the molten material in the converting zone to convert matte to copper, causing slag formed in the converting zone to flow through the restricted passage into the slag separation zone countercurrent to the flow of matte, separating matte from slag in the slug separation zone and returning the matte to he converting zone, withdrawing copper from the copper outlet and withdrawing slag from the slag outlet.

---

This is a division of application Pat. 3,527,449 issued on Sept. 8, 1970, filed Nov. 18, 1966.

This invention relates to improvements in the reverberatory smelting of copper ores and concentrates. The term "concentrates" in this specification includes ores and concentrates used separately or together and with or without other materials.

Over recent years considerable improvements have been effected in the efficiency of reverberatory smelting of sulphide concentrates of copper but as far as we are aware no known process has been evolved to go further than the production of a copper-iron-sulphur matte which must then be transferred by ladle to a converter and blown batch-wise to blister copper.

In conventional reverberatory furnace practice, concentrates are charged usually near the long walls of the furnace, over a considerable portion of the length of the furnace. The concentrates may be roasted or unroasted. In the former case less carbonaceous fuel is required in smelting but dust losses may be higher than is the case when wet cold concentrates are charged along the walls of the furnace and are progressively dried and melted down by the flames and reverberated heat inside the furnace.

Firing is normally carried out with pulverised coal, oil or natural gas from one end of the long rectangular furnace and the slag is tapped at or near to the opposite end from which also the hot gases emerge to pass to waste heat boilers or heat exchangers or directly to a stack. The gases are rarely if ever suited for conversion into sulphuric acid because they are too low in sulphur dioxide content and/or too high in carbon dioxide content.

Matte is tapped from conventional reverberatory furnaces through one or more tapholes in the side wall and usually towards the end of the furnace from which slag and waste gases emerge.

Whilst the roof of conventional reverberatory furnaces may be at different levels and shaped to assist the reverberation of heat onto the bath, the hearth of the furnace is disposed more or less horizontally, except possibly for a slight slope towards the matte tapping holes in one of the side walls.

It is an object of the present invention to provide a novel and improved method for the continuous production of copper directly from concentrates, and a novel and improved reverberatory-type furnace for carrying out such method.

According to the invention, a method of continuous smelting and converting of copper concentrates in a reverberatory-type furnace comprises forming in the furnace a smelting zone, a converting zone and a slag separation zone, the converting zone being located between the smelting zone and the copper outlet and the slag separation zone being disposed between the smelting zone and the slag outlet, feeding concentrates into the smelting zone, forming a restricted passage in the smelting zone between the converting zone and the slag separation zone, jetting oxidising gas into the molten material in the smelting zone to effect turbulence therein, smelting the concentrates in the smelting zone, causing matte formed in the smelting zone to flow into the converting zone, jetting oxidising gas into the molten material in the converting zone to convert matte to copper, causing slag formed in the converting zone to flow through the restricted passage in the smelting zone into the slag separation zone countercurrent to the flow of matte, separating matte from slag in the slag separation zone and returning it to the converting zone, withdrawing copper from the copper outlet, and withdrawing slag from the slag outlet.

The zone of the furnace into which the concentrates are fed is preferably limited to not more than 30% of the furnace length, and is preferably located approximately midway of the furnace. The copper outlet is preferably located at one end of the furnace and the slag outlet is preferably located at the other end. The concentrates are preferably pelletised, granulated or otherwise agglomerated, and are preferably fed into the smelting zone so as to form heaps or banks of concentrates at each side of the furnace which project into the smelting zone and form between them a restricted passage through which slag may flow from the converting zone to the slag separation zone and through which matte may flow from the slag separation zone to the converting zone.

Oxidising gas such as air or oxygen enriched air is jetted into the molten material in the smelting zone and in the converting zone, preferably by means of lances the tips of which are submerged during operation below the slag level, the lances being arranged to enter the furnace through the roof or walls, or both. Burner flames may be directed onto the heaps or banks of concentrates in or adjacent to the smelting zone, the said flames causing the surface of the massed concentrates to continuously melt and flow down over and into the slag in, or in the vicinity of, the smelting zone. Melting of the concentrate feed is also assisted by splashing of slag and matte from the bath caused by the turbulence generated by the jetting of oxidising gas into the bath.

At least portion of the outgoing furnace gases are withdrawn from above the smelting zone by one or more gas offtakes, preferably in such a manner as to permit radiation heat and convection heat transfer to the ingoing concentrates.

The surface of the slag in the three zones, namely the converting zone, the smelting zone and the slag separation zone is substantially horizontal and at approximately the same level.

The floor of the furnace slopes generally downwards from the slag outlet end to the copper outlet end, except for the floor of the smelting zone, which is preferably approximately horizontal. The floor is preferably stepped at or about the junction of the smelting zone with the slag separation zone, the floor of the slag separation zone being generally higher than that of the smelting zone. The slope of the floor of the converting zone is preferably steeper than that of the slag separation zone, and is preferably between 5° and 20°. The floor of the converting zone slopes downwardly to a copper reservoir which is located between the converting zone and the copper taphole or outlet, and the depth of the molten material in the copper reservoir is preferably between 2 to 4 times the depth of the bath in the smelting zone.

As previously stated, at least one restricted passage is formed in the furnace between the converting zone and the slag separation zone, by means of projections or peninsulas formed of refractory brickwork or of heaps or banks of concentrates or by other means. The restricted passage or passages help to separate the turbulent and vigorously reacting converting zone from the relatively quiescent slag separation zone, and also force the slag flowing from the converting zone to the slag separation zone to pass through a narrow "strait" in which the slag is vigorously mixed with freshly formed matte. The latter, having a higher sulphur content and lower copper content than the matte and white metal in the converting zone, assists in "washing" copper out of the slag.

This "washing" action is of importance in contributing to low copper losses in slag and in many cases, and particularly when concentrates richer than 25% copper are being charged, it is preferably supplemented by further "washing" action in the slag-matte separation zone itself.

One method of achieving this further "washing" action is to blow onto or otherwise spread over and into the slag a material such as concentrates rich in iron sulphide, pyrites, pyrrhotite, or low grade copper sulphide concentrates. These materials may be added in a "prilled" or finely granulated form using oil as the "bonding" liquid in forming the granules. The oil provides a source of heat, supplementing that of the burning sulphur from the iron sulphide and also helps to maintain a slightly reducing atmosphere at or near the slag surface, thereby substantially preventing magnetite formation in the slag.

The removal of copper from slag may be further assisted by banking the walls of the slag separation zone with pyrites.

It is also advantageous to effect a gentle circulation of the slag in the slag separation zone, which may be induced by burners in the side walls. This circulation helps not only to distribute the sulphides or other additives more completely in the slag surface but also increases the residence time of the slag in the slag separation zone. It also prevents the formation of straight "channels" of slag flowing directly from the smelting zone to the slag outlet.

Another method by which gentle circulation can be induced in the slag in the slag separation zone is by passage of an electric current through the slag and between two carbon electrodes appropriately located and immersed to a suitable depth in the slag.

The residence time of the slag in the slag separation zone, and the separation of matte and slag in said zone, are increased by the provision of a slag pool or reservoir located immediately ahead of the slag taphole end of the furnace. Further gentle circulation of the slag, by means of burners or the like, can be induced in the slag pool region, to further reduce copper losses in the slag.

If flame jets are used to induce surface circulation in the slag separation zone and slag pool it is desirable that they be either neutral or slightly reducing otherwise magnetite may form unduly in the slag. The magnetite which crystallises out of the liquid slag tends to form wall accretions which militate against the free and unhindered settling of matte prills.

The small amount of matte which settles out in the slag pool can be tapped at appropriate intervals (e.g. once per day) via a submerged taphole and returned by ladle back to the smelting zone.

Reference will now be made to the forms of the invention illustrated in the accompanying drawings, wherein:

FIG. 1 is a longitudinal sectional elevation of one form of reverberatory furnace for carrying out the invention.

FIG. 2 is a sectional plan view of the furnace shown in FIG. 1, taken on the line 2—2 of FIG. 1.

FIG. 3 is a sectional plan view of another form of furnace according to the invention.

FIG. 4 is a vertical sectional elevation of one end of the furnace shown in FIG. 3, taken along the line 4—4 of FIG. 3.

Figure 5:
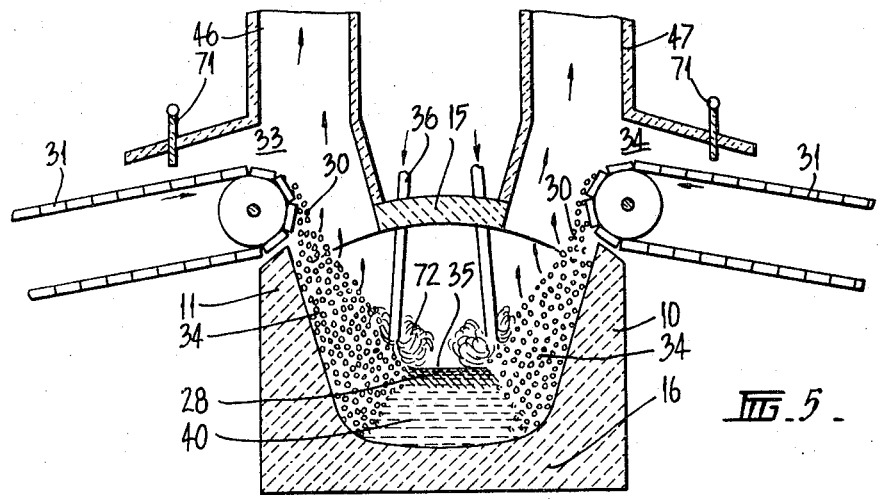
FIG. 5 is a view in cross-sectional end elevation through the feeder zone of the furnace of the general form shown in FIGS. 1 and 2 taken on the line 5—5 of FIG. 2.

Referring now to FIGS. 1 and 2, the furnace shown is of elongated rectangular shape with refractory side walls 10, 11, end walls 12 and 13, roof 15 and hearth 16. In the furnace are three zones, indicated generally as:

A—the feed and smelting zone;
B—the converting zone;
C—the slag separation zone.

The feed and smelting zone is located substantially centrally of the furnace, and preferably occupies less than 30% of the furnace length. The copper taphole is located at one end of the furnace and the slag taphole is located at the opposite end of the furnace. The converting zone B is located between the feed and smelting zone A and the copper taphole end of the furnace, and the slag separation zone is located between the feed and smelting zone A and the slag taphole end of the furnace.

The feed material used is preferably pelletised, granulated, lump or otherwise agglomerated copper sulphide concentrates, which may be pre-blended with a proportion of flue dust fines, silica flux, fuel oil or other materials. The feed material preferably contains 5% to 10% of water, and is desirably in the form of pellets or granules which can be fed by means of conveyors of the type described herein and which are capable of rilling under gravity over pre-formed heaps of feed material in the furnace.

The roof 15 of the furnace may be of any desired shape, e.g. suspended arch, but is preferably substantially horizontal in the longitudinal direction. The floor of the hearth 16 slopes from the slag taphole end of the furnace generally downwards towards the copper taphole end with a step 17 situated approximately at the junction of the slag separation zone C and the feed and smelting zone A. The floor 18 of the hearth 16 in zone A is preferably horizontal. The floor 19 of the hearth 16 in zone C slopes downwardly from the slag taphole end towards step 17. The floor 20 of the hearth 16 in zone B slopes downwardly from zone A towards the sump 21 immediately ahead of the copper reservoir 22 at an angle between 5° and 20° and preferably so that the depth of the molten material in the reservoir 22 is between 2 to 4 times that in zone A. A syphon passage 23 is provided between the sump 21 and the reservoir 22 and copper is removed continuously or semicontinuously via lip taphole 24.

A slag pool 25 is provided adjacent to the slag taphole 26, into which slag 28 flows over the ridge or weir 27. In the slag pool 25 there is opportunity for further settling of matte before the slag leaves the furnace via lip taphole 26. A submerged taphole 29 is provided at the bottom of the pool 25 for periodic removal of matte. The ridge 27 between the sloping floor 19 of zone C and the pool 25 may be fluid cooled.

The concentrates 30 are fed to the furnace at each side of the feed and smelting zone A by means of feeding devices which comprise two pan conveyors 31. The pan conveyors 31 are mounted transversely of the furnace on opposite sides thereof and are arranged to deliver the concentrates 30 through ports 32, 33 in the upper parts of the side walls 10, 11 of the furnace. The concentrates 30 delivered by the pan conveyors 31 fall under gravity into the smelting zone A of the furnace and form heaps or banks 34 of concentrates. Concentrates delivered onto the heaps 34 from the conveyors 31 rill downwardly over the heaped material into the smelting zone A. The banks 34 extend out from the side walls 10, 11 of the furnace as peninsulas thereby leaving a relatively narrow or restricted passage 35 between the heaps or banks 34. The pasage 35 is of sufficient width to allow slag 28 to flow therethrough from the converting zone B to the slag separation zone C and to allow matte 40 which separates out from the slag in the zone C to flow from zone C beneath the slag 28 into zone B. In FIGS. 2 and 3 the matte flow is shown generally by the full line arrows, and the slag flow is shown generally by the dotted line arrows.

Lances 36 and burner tubes 37 extend through the roof 15 of the furnace. The lances 36 direct air or oxygen enriched air into the molten material in, or in the vicinity of, the smelting zone A and cause turbulence and splashing of molten material in said zone. The burners 37 direct oxidising flames onto the concentrates in the heaps 34.

The heaps 34 of concentrates are continuously melted by the action of reverberated heat, jetted oxidising flames from burners 37 and splashed slag and matte from the lancing of oxidising gases into or onto the bath. Continuous smelting of concentrates takes place in zone A of the furnace. The matte 40 which forms from the smelting of the concentrates collects in the smelting zone A to the left of step 17 and flows generally towards the copper taphole end of the furnace through the converting zone B. In zone B air or air enriched with oxygen is injected into the bath via lances 41. The tips of the lances 41 (which may be fluid cooled) are submerged below the level of the slag 28 in the bath. The iron oxide (FeO) which is formed during the converting action between air and matte is continuously fluxed by silica which is added through ports 42 in the side walls 10, 11 in such a manner as to form continuous banks 43 along the side walls 10, 11 up to and including the end wall 12.

Figure 6:
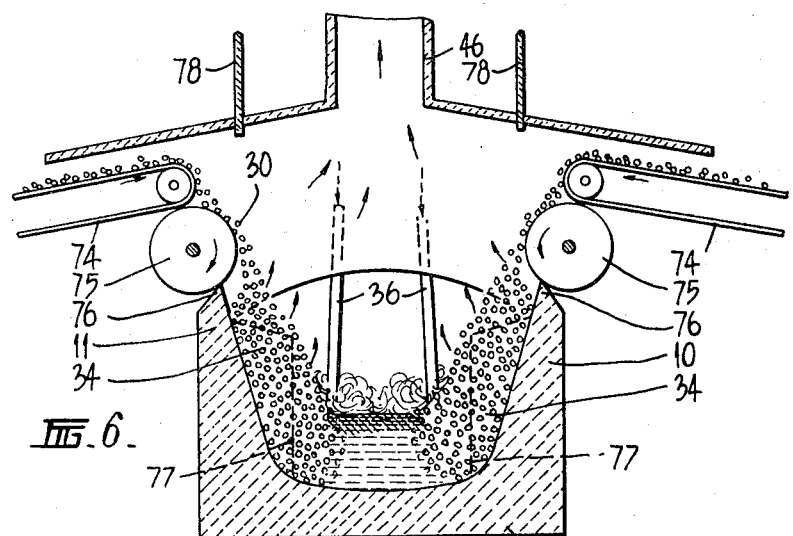
FIGS. 6 and 7 are views in cross-sectional end elevation through the feeder zones of furnaces according to two other forms of the invention.
Figure 7:
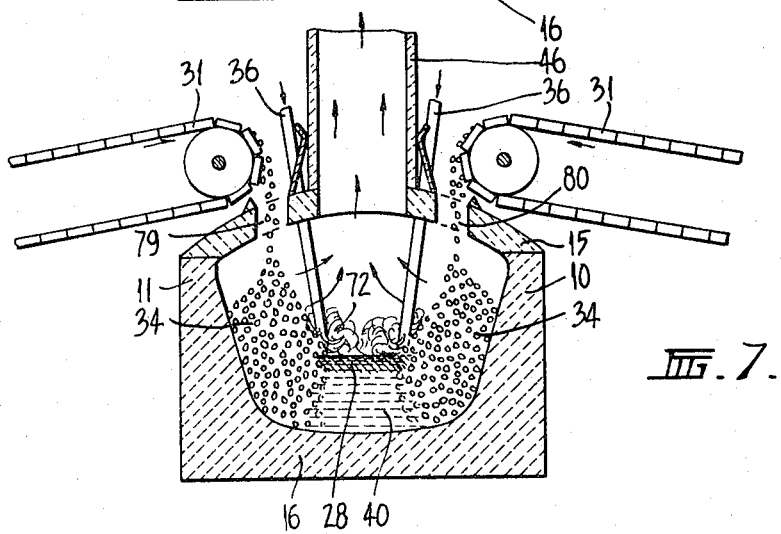

The hot gases leave the furnace through side gas offtakes 46, 47 as shown in FIG. 5 or through a central gas offtake 46 as shown in FIGS. 6 and 7 and the said gases pass upwards countercurrently to the descending concentrates 30. From the gas offtakes 46, 47 the gases may pass to dust and heat collecting systems (not shown).

To assist in the removal and settling of copper from the slag 28, suitable reductants 48 are added to the slag separation zone C, as through feeder 49. Iron pyrites, preferably pre-granulated or prilled, may be added to reduce the ferric iron in the slag and "wash" out the copper. Banks 57 of pyrites may be formed along the walls of the slag separation zone C.

To aid the distribution of the pyrites or other reductant(s) and to increase the residence time of the slag 28 in the slag separation zone C, nutral or reducing flames may be jetted at an oblique angle from burners 50 so as to cause the general circulation of the surface slag in the direction of the arrows 51. It is also advantageous to cause further gentle circulation in the surface layers of the slag in the pool 25 by the action of burners 52, to produce eddies and flow in the direction of arrows 53.

Burners 55 are also provided over the copper reservoir 22 not only to keep the metal hot but also to assist in oxidising out some of the residual sulphur. The hot sulphur dioxide-containing gases are admitted into the furnace proper through port 56.

Coolants, such as cement copper or other copper-rich materials, and also lump sulphide ore or agglomerated copper concentrates may be added to the converting zone through feeder 58.

In the form of the invention shown in FIGS. 3 and 4—

(a) lancing is effected through the sides of the furnace by means of lances 60, and
(b) peninsula heaps 68, 69, 70 of agglomerated concentrates are built up so as to form an extended narrow passage 61 through which the slag must flow from the converting zone B into the slag separation zone C.

As shown in FIG. 3, two pan conveyors 62, 63 mounted side by side deliver concentrates to adjacent ports 64, 65 in the side wall 10 of the furnace, and a single pan conveyor 66 is mounted on the other side of the furnace opposite to a point midway between the conveyors 62, 63 so as to deliver concentrates through a port 67 in the side wall 11. The concentrates delivered by the conveyors 62, 63, 66 form heaps or banks 68, 69, 70 respectively, the heaps or banks 68, 69 being offset with respect to the heap 70, thereby forming a sinuous passage 61 of extended length and restricted width between zone B and zone C. The longer narrow passage between the multiple banks gives better opportunity for chemical reduction of the ferric iron in the slag and for the separation and settling of copper entrained therein.

The banks 43 of silicious flux in the converting zone B are preferably built up to such a level that they submerge the side wall lances 60, thus protecting the latter from the corrosive action of hot molten matte.

FIG. 5 shows a form of the invention with two gas offtakes, 46 and 47. In this form, baffles 71 may be employed to control the ingress of air above the pan conveyors 31. The hot gases leaving the furnace carry out with them any steam liberated from the damp concentrates as they are rapidly dried by the radiant and convection heat in the furnace. The melting of the heaps 34 of concentrates is greatly assisted by the splash 72 generated by the air injected through lances 36.

In FIG. 6 another form of the invention is shown in which a single central gas offtake 46 is provided. In this form, a combination of belt feeders 74 and roll feeders 75 is used in place of the pan conveyors 31. The roll feeders 75 revolve slowly, carrying the feed material into a position where it will drop on to peninsula heaps 34. Under optimal operating conditions the drum feeders 75 become sufficiently hot to assist in the rapid drying of the concentrates fed thereon from belt conveyors 74. Scrapers are provided at 76 to keep the surfaces of the drums 75 clean and to prevent transfer of material to the outside of the furnace. The dotted lines 77 indicate the possible positions for brick peninsulas which may be used to support portion of the rilling heaps 34 of concentrates.

Baffles are provided at positions such as 78 so that in the event that maintenance work is necessitated on either the drum feeders 75 or the belt conveyors 74, the baffles 78 can be lowered to isolate those components from the furnace heat and hot gases.

FIG. 7 shows yet another form of the invention in which the concentrates 30 are fed onto the heaps 34 through openings 79, 80 in the roof 15. In this form, as less opportunity is presented for heat exchange from outgoing gases to the ingoing concentrates, it is preferable if the feed material is dried and partially preheated in separate equipment. This drying and pre-heating can appropriately be effected by heat exchange from the outgoing furnace gases. The feed pellets are preferably not heated above 350° C., otherwise they may ignite losing free atom sulphur outside the furnace and may also cause handling and feeding difficulties.

It has been found that pelletisation is assisted and stronger pellets are produced if the collected flue dust fines and other fine oxided cupriferous materials are pre-blended in with the flotation concentrates and a little sulphuric acid or acid pickle liquor is added to the water used for pelletisation. On drying, such pellets develop considerable strength and furthermore they do not tend to burst nor dust badly as they feed down into the furnace proper over the drum feeder, pan feeder or other suitable feeding device. It is preferable not to subject the green pellets to too much mechanical jarring or pressure. For this reason push feeders or those developing strong vibrations are generally less satisfactory than drum or pan feeders.

An appropriate proportion of fine silica flux can also be blended in during the prepelletisation operation. The addition of a litle fuel oil may also be added at this stage should the concentrates be deficient in sulphur, as for example when some oxidised ore is added to the blend. The oil gives an additional bonding effect in the granules and also provides a supplementary fuel in the smelting zone.

Apart from any silica flux which may be present in or be added to the ingoing concentrates it is necessary to add more silica, either as sand or as finely crushed siliceous ore, to the converting zone. It is advantageous to add most if not all of this flux along the walls of the converting zone. Here it provides a protection for the wall refractories.

In all regions of the furnace where iron is being oxidised out of the matte there should be ample silica on hand to flux the FeO as it is generated, otherwise the formation of undersirably large quantities of magnetite will occur.

In conventional practice most of the heat required in the reverberatory furnace has to be provided by the combustion of pulverised coal or other carbonaceous fuel. The furnace of this invention, on the other hand, operates substantially autogenously and even when blown with cold air it may generate so much heat in the bath that coolants have to be added, such as cement copper and miscellaneous copper-rich material.

The present invention, combining as it does in one furnace the functions of the converter with that of the reverberatory furnace and eliminating the necessity for batchwise transfer of matte in ladles to a separate furnace (the normal converter), achieves considerably greater thermal efficiency. As a result of the use of less carbonaceous fuel, the gases emitted from the furnace have a lower content of carbon dioxide than in conventional practice. Furthermore, they have a significantly higher content of sulphur dioxide, and are suited for conversion to sulphuric acid, after appropriate heat extraction and collection of any entrained dust.

The temperatures in the smelting and converting zones of the furnace are preferably within the range 1230° C. to 1280° C.

While this invention is primarily concerned with the provision of an improved type of straight line or linear furnace in which the continuous production of metallic copper directly from concentrates can be carried out, the invention can also be applied to other shapes of furnaces. Thus, the invention can be applied in an L-shaped or a U-shaped furnace. In these cases the smelting zone is preferably located at the corner of the L or the bend in the U shape. In such cases, the converting zone is in one arm of the L or U and the slag separation zone is in the other arm.

EXAMPLE

The following is an example of the invention using flotation concentrates from Mount Lyell, Tasmania, of the following average composition:

| | Percent |
|---|---|
| Cu | 27.0 |
| Fe | 31.5 |
| S | 33.0 |
| $SiO_2$ | 4.5 |
| Other | 4.0 |

The concentrates were pre-blended with returned flue dust of the following average composition:

| | |
|---|---|
| Cu | 17.6%. |
| Fe | 23.8%. |
| S | 9.1% of which between 30% and 80% was present as sulphate. |
| $SiO_2$ | 4.1%. |
| Other | 55.4%. | in the ratio of 97% concentrates and 3% returned flue dust fines. The blended concentrates and the flue dust fines were then pelletised in a disc pelletiser with the addition of water containing a small quantity of either pickle liquor or 2%–3% sulphuric acid. It has been found that the amount of acid or pickle liquor used can be reduced to virtually nil when more than 50% of the sulphur in the return flue dust fines is present as sulphate.

The pellets ranged from 3 mm. to 10 mm. in diameter, averaging 6 mm., and after partial air drying were fed into a furnace of the type shown in FIGS. 1 and 2. Peninsula banks of melting pelletised concentrates were built up in opposing positions in the furnace such as are shown at 34 in FIG. 2. Silica flux in the form of clean dune sand containing 97% $SiO_2$ was used as a flux and fed in through ports as shown at 42 in FIGS. 1 and 2.

The air blown in through lances 36 and 41 had been compressed to 15 p.s.i.g. Cheap sulphur-bearing fuel oil was used in the burners 36, 50, 52 and 55. The total heat input from these sources was equivalent to approximately 1 million B.t.u. per ton of copper produced which is about one fifth of the heat input required for conventional reverberatory practice with wet concentrate charging and approximately one third the heat required when hot roasted concentrates are charged to the conventional reverberatory furnace.

The slag tapped at 26 had an average composition of:

| | Percent |
|---|---|
| $SiO_2$ | 38 |
| FeO | 52.3 |
| Other oxides | 8.0 |
| Cu | 0.4 |
| S | 1.0 |

The copper tapped at 24 contained:

| | |
|---|---|
| Cu | 99.1 |
| S | 0.7 |
| Other | 0.2 |

The flue gas leaving the furnace at 46, 47 contained on the average 9% $SO_2$ and would have been suitable for acid manufacture. The dust carryover when the furnace was under proper control amounted to less than 3% and for considerable periods during the trial was less than 1%. These trials have shown that it is possible to produce metallic copper in the furnace of this invention with copper losses in slags comparable to or better than conventional reverberatory practices in which, of course, only matte is produced.

What is claimed is:

1. A method of continuous smelting and converting of copper concentrates in a reverberatory-type furnace which comprises forming in the furnace a smelting zone, a converting zone and a relatively quiescent slag separation zone, the converting zone being located between the smelting zone and a copper outlet and the slag separation zone being disposed between the smelting zone and a slag outlet, gravity feeding concentrates into the smelting zone to form heaps or banks of concentrates at each side of the furnace which form a restricted passage in the smelting zone between the converting zone and the slag separation zone, the restricted passage separating the converting zone from the relatively quiscent slag separation zone, jetting oxidizing gas into the molten material in the smelting zone to effect turbulence therein, smelting the concentrates in the smelting zone, causing matte formed in the smelting zone to flow into the converting zone, jetting oxidizing gas ino the molten material in the converting zone to convert matte to copper, causing substantial flow of slag formed in the converting zone through the restricted passage in the smelting zone into the slag separation zone countercurrent to the flow of matte, separating matte from slag in the slag separation zone, causing matte in the slag separation zone to flow to the converting zone, withdrawing copper from the copper outlet, and withdrawing slag from the slag outlet.

2. A method according to claim 1 wherein the section of the furnace into which the concentrates are fed is restricted to not more than 30% of the length of the furnace.

3. A method according to claim 2 wherein the section of the furnace to which the concentrates are fed includes the smelting zone and is located about midway along the furnace.

4. A method according to claim 1 wherein the copper outlet is located at one end of the furnace, the slag outlet is located at the other end of the furnace and including at least partially controlling the flow of slag and matte by sloping the floor of the furnace generally downwards from the slag outlet to the copper outlet.

5. A method according to claim 4 wherein the floor of the smelting zone is substantially horizontal.

6. A method according to claim 4 wherein the floor is stepped upwardly from the smelting zone to the slag separation zone.

7. A method according to claim 4 wherein the floor of the converting zone slopes at an angle between 5° and 20° and including the step of controlling the maximum depth of molten material in said zone so that the maximum depth is two to four times that of the molten material in the smelting zone.

8. A method according to claim 4 wherein copper formed in the converting zone is caused to flow into a copper reservoir by providing a syphon passage between the converting zone and the copper reservoir and withdrawing copper therefrom through a taphole.

9. A method according to claim 4 wherein the slag flows over a ridge or weir in the slag separation zone into a slag pool and is withdrawn from the slafi pool through the slag outlet.

10. A method according to claim 1 including effecting gentle circulation of the slag in the slag separation zone, while maintaining generally quiescent conditions in said slag separation zone.

11. A method according to claim 1 including the steps of agglomerating the concentrates before they are fed into the furnace and feeding the agglomerated concentrates into the furnace.

12. A method according to claim 1 including feeding the agglomerated concentrates into the furnace by means of pan or belt feeders, and rilling the concentrates downwardly over the preformed heaps or banks of concentrates into the smelting zone.

13. A method according to claim 1 including forming the heaps or banks on opposite sides of the furnace offset relative to one another so as to form a sinuous extended passage therebetween.

14. A method according to claim 1 including heating the heaps or banks of concentrates by burner flames and by splashing the molten material caused by the turbulence in the smelting zone and heating the ingoing concentrates by the outgoing furnace gasses.

15. A method according to claim 1 including forming banks of siliceous material along the walls of the converting zone.

References Cited

UNITED STATES PATENTS

| | | | |
|---|---|---|---|
| 596,747 | 18/1898 | Garretson | 75—73 |
| 596,991 | 1/1898 | Garretson | 75—73 |
| 596,992 | 1/1898 | Garretson | 75—73 |
| 782,123 | 2/1905 | Garretson | 75—73 |
| 1,803,663 | 5/1931 | Carson | 75—73 |
| 1,850,025 | 3/1932 | McGregor | 75—74 X |
| 3,222,162 | 12/1965 | Beals et al. | 75—74 X |
| 3,102,806 | 9/1963 | Zimmerly | 75—74 |
| 3,351,462 | 11/1967 | Arentzen | 75—74 |
| 3,437,475 | 4/1969 | Themelis et al. | 75—74 |

HENRY W. TARRING II, Primary Examiner